United States Patent

Goodwin, III et al.

[19]

[11] Patent Number: 5,818,346
[45] Date of Patent: Oct. 6, 1998

[54] METHOD OF LOCATING ELECTRONIC PRICE LABELS IN TRANSACTION ESTABLISHMENTS

[75] Inventors: John C. Goodwin, III, Suwanee; Terry L. Zimmerman, Lawrenceville, both of Ga.

[73] Assignee: NCR Corporation, Dayton, Ohio

[21] Appl. No.: 603,007

[22] Filed: Feb. 16, 1996

[51] Int. Cl.[6] ............................. G08B 5/22; H04Q 7/00
[52] U.S. Cl. ................. 340/825.49; 340/825.35
[58] Field of Search .............. 340/825.49, 825.35, 340/825.54, 572; 342/457; 395/201, 228; 455/456, 67.7

[56] References Cited

U.S. PATENT DOCUMENTS

| | | | |
|---|---|---|---|
| 4,891,650 | 1/1990 | Sheffer | 342/457 |
| 5,241,467 | 8/1993 | Failing et al. | 395/201 |
| 5,245,534 | 9/1993 | Waterhouse et al. | 395/228 |
| 5,515,419 | 5/1996 | Sheffer | 455/456 |
| 5,548,282 | 8/1996 | Escritt et al. | 340/825.35 |
| 5,604,923 | 2/1997 | Wilkus | 455/67.7 |

*Primary Examiner*—Edwin C. Holloway, III
*Attorney, Agent, or Firm*—Paul W. Martin; Peter H. Priest

[57] ABSTRACT

A method of locating an electronic price label in a transaction establishment which relies on known location information from other electronic price labels. The method includes the steps of receiving a message from the electronic price label, determining a first approximate location of the electronic price label from characteristics of the return message, selecting other electronic price labels in proximity with the approximate location, receiving messages from a number of the other electronic price labels whose locations are known, determining which of the number of the other electronic price labels is closest to the electronic price label from characteristics of the messages from the number of the other electronic price labels, and determining a second approximate location of the electronic price label based on the location of the closest electronic price label.

20 Claims, 5 Drawing Sheets

```
EPL LOCATION REPORT
------------------

PRIMARY LOCALES:     4C
                     WINE SECTION FRONT LEFT

SECONDARY LOCALES:   3B, 3C, 3D, 4B, 4D, 5B, 5C, OR 5D
                     BAKERY MID-FRONT
                     WINE SECTION FRONT RIGHT
                     WINE SECTION MID LEFT
                     WINE SECTION END CAP
                     BAKERY MIDDLE
                     BAKERY FRONT
                     WINE SECTION MID RIGHT
                     WINE SECTION END CAP RIGHT
```

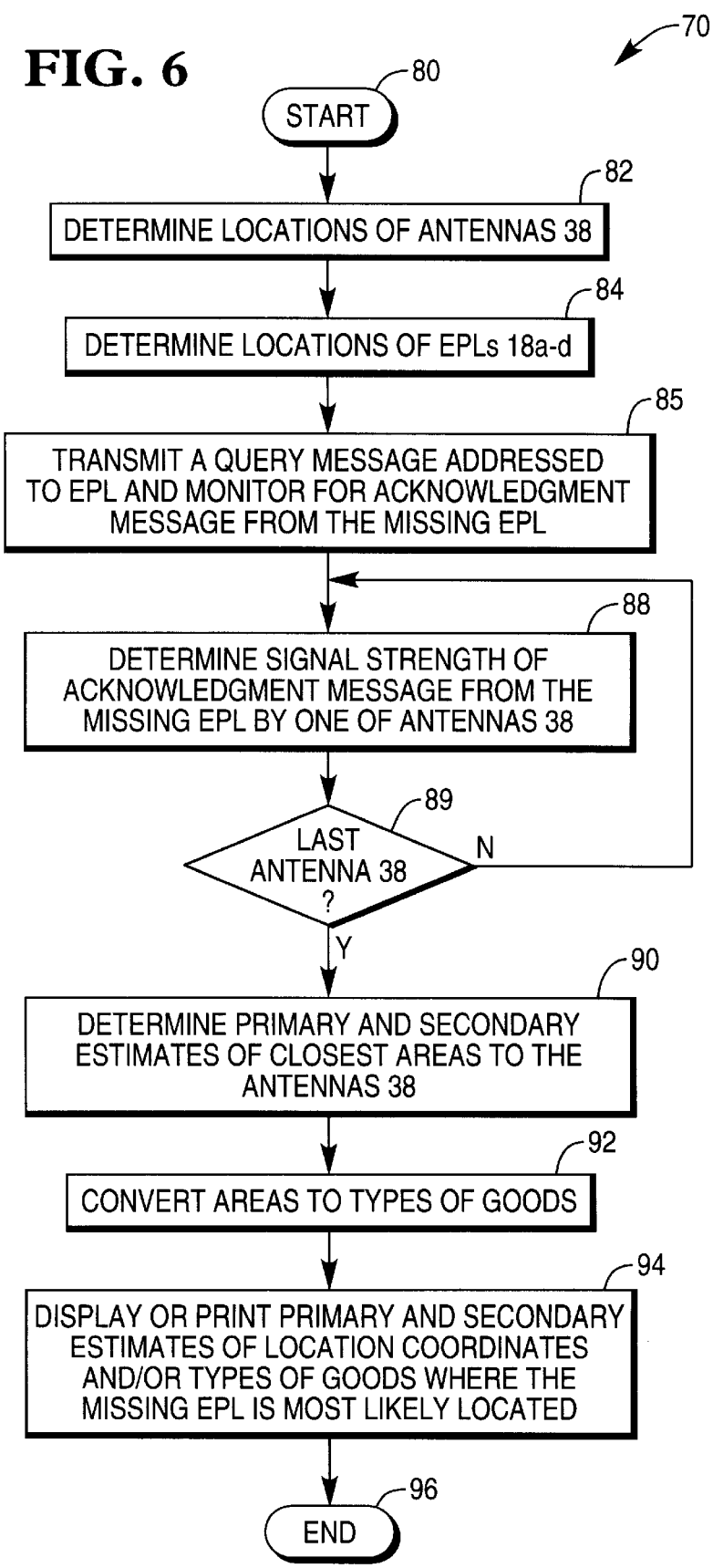

METHOD OF LOCATING ELECTRONIC PRICE LABELS IN TRANSACTION ESTABLISHMENTS

CROSS-REFERENCE TO RELATED APPLICATIONS

The present invention is related to the following commonly assigned and co-pending U.S. applications:

"Method Of Locating Electronic Price Labels In Transaction Establishments", filed Oct. 5, 1995, invented by Goodwin, and having a Ser. No. 08/539,450; and "Device and Method Of Locating Electronic Price Labels In Transaction Establishments", filed Jan. 30, 1996, invented by Goodwin et al., and having a Ser. No. 08/593,983.

BACKGROUND OF THE INVENTION

The present invention relates to electronic price label (EPL) systems used in transaction establishments, and more specifically to a method of locating an electronic price label in transaction establishments.

EPL systems typically include a plurality of EPLs for each merchandise item in a store. EPLs typically display the price of corresponding merchandise items on store shelves and are typically attached to a rail along the leading edge of the shelves. A store may contain thousands of EPLs to display the prices of the merchandise items. The EPLs are coupled to a central server from where information about the EPLs is typically maintained in an EPL data file. Price information displayed by the EPLs is obtained from the PLU file.

EPLs today may be wired or wireless. Wireless EPLs may employ infrared or radio frequency transmitters to transmit acknowledgment signals acknowledging receipt of messages and to relay acknowledgment signals from other EPLs to receiving devices coupled to a main EPL computer. An EPL only sends an acknowledgment if the message is addressed to it.

It is desirable to determine the location of wireless EPLs that have been removed from their assigned shelf locations. Eventually, EPLs become displaced from their mounting brackets. An individual may accidentally knock the EPL out of its mounting bracket and place it on a different shelf. An individual may intentionally remove the EPL and place it in another location within the store, or remove it from the store.

SUMMARY OF THE INVENTION

In accordance with the teachings of the present invention, a method of locating an electronic price label in transaction establishments is provided.

The method includes the steps of receiving a message from the electronic price label, determining a first approximate location of the electronic price label from characteristics of the return message, selecting other electronic price labels in proximity with the approximate location, receiving messages from a number of the other electronic price labels whose locations are known, determining which of the number of the other electronic price labels is closest to the electronic price label from characteristics of the messages from the number of the other electronic price labels, and determining a second approximate location of the electronic price label based on the location of the closest electronic price label.

It is accordingly an object of the present invention to provide a method of locating an electronic price label in transaction establishments.

It is another object of the present invention to provide a method of locating wireless EPLs in transaction establishments.

It is another object of the present invention to provide a method of locating EPLs in transaction establishments that relies on known location information for other electronic price labels.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 6 is a flow diagram illustrating a method of obtaining an approximate location of a missing EPL.

DETAILED DESCRIPTION OF THE PREFERRED EMBODIMENT

Figure 1:
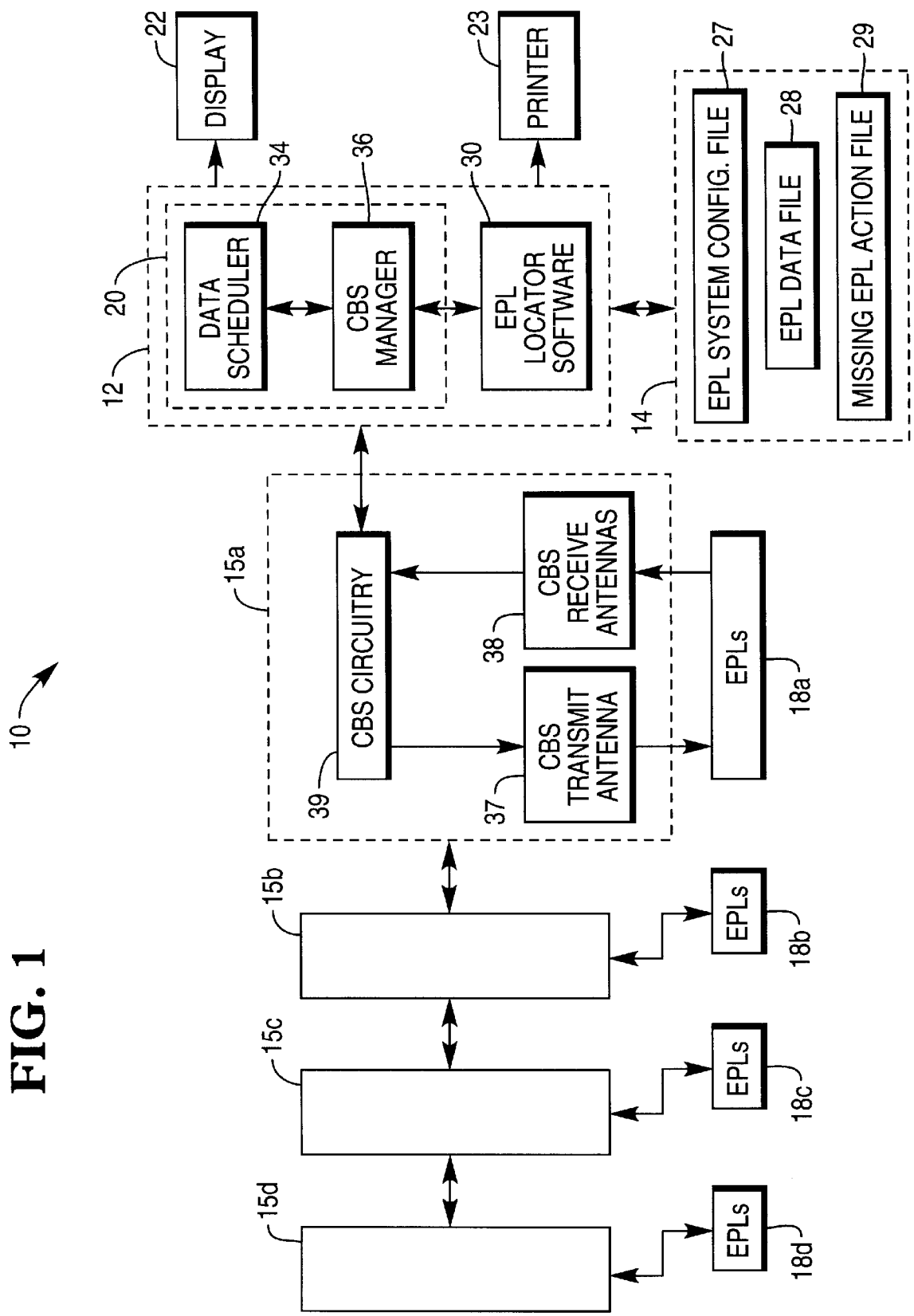
FIG. 1 is a block diagram of an EPL system.

Referring now to FIG. 1, EPL system 10 includes computer 12, storage medium 14, communication base stations (CBSs) 15a–d, electronic price labels (EPLs) 18a–d, display 22, and printer 23.

Computer 12 executes EPL control software 20 and EPL locator software 30. EPL control software 20 records, schedules, and transmits all messages to EPLs 18a–d through CBSs 15a–d, and receives and analyzes status messages from EPLs 18a–d through CBSs 15a–d. Such messages include queries to individual EPLs requesting an acknowledgment signal from the individual EPLs so that EPL locator software 30 can determine where the individual EPLs are located. EPL control software 20 also maintains and uses EPL data file 28, which contains item information, identification information, item price verifier information, and status information for each of EPLs 18a–d.

EPL control software 20 primarily includes data scheduler 34 and CBS manager 36. Data scheduler 34 schedules EPL price change messages to be sent to EPLs 18a–d through CBSs 15a–d.

EPL system configuration file 27 tells computer 12 how system 10 is configured, i.e., the addresses of EPL system components and their location within the transaction establishment relative to other components within system 10, and the location of different types of goods in the system.

EPL locator software 30 automatically monitors EPL system 10 for received signal strength and determines the location of missing EPLs. EPL locator software 30 displays on display 22, prints using printer 23, and/or stores in missing EPL action file 29 the search results. The search results may indicate that no acknowledgment messages have been received from the missing EPL, indicating that it is not functioning or not located within the transaction establishment.

Storage medium 14 is preferably a fixed disk drive. Storage medium 14 stores EPL system configuration file 27, EPL data file 28, and missing EPL action file 29.

CBSs 15a–d are connected together in series. Here, only four CBSs are shown. CBSs 15a–d each include one transmit antenna 37 and one to four receive antennas 38 for transmitting and receiving messages between CBSs 15a–d and EPLs 18a–d. CBSs 15a–d each include CBS circuitry 39 which controls operation of each CBS.

CBS manager 36 schedules the actual transmission of price change messages to EPLs 18a–d and the reception of status messages from EPLs 18a–d for predetermined time slots.

Figures 2, 7:
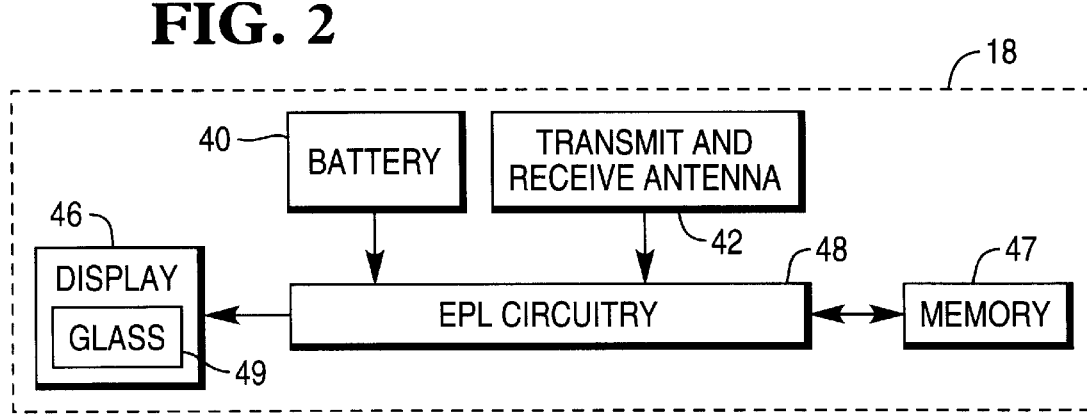
FIG. 2 is a block diagram of an EPL.
FIG. 7 is a sample report generated by EPL locator software.

Turning now to FIG. 2, EPLs 18a–d each include battery 40, transmit and receive antenna 42, display 46, memory 47, and EPL circuitry 48.

Battery 40 provides power to EPLs 18a–d.

Transmit and receive antenna 42 receives price change and status messages from CBSs 15a–d.

Transmit and receive antenna 42 transmits responses to price change and status messages to CBSs 15a–d.

Display 46 displays price and possibly additional information. Display 46 is preferably a liquid crystal display (LCD) and includes glass 49, but could be a flexible material such as plastic rather than glass.

Memory 47 stores price verifier information and other display information, such as promotional information. Preferably, the price verifier information is a checksum of the displayed price.

EPL circuitry 48 controls the internal operation of EPLs 18a–d.

Figure 3:
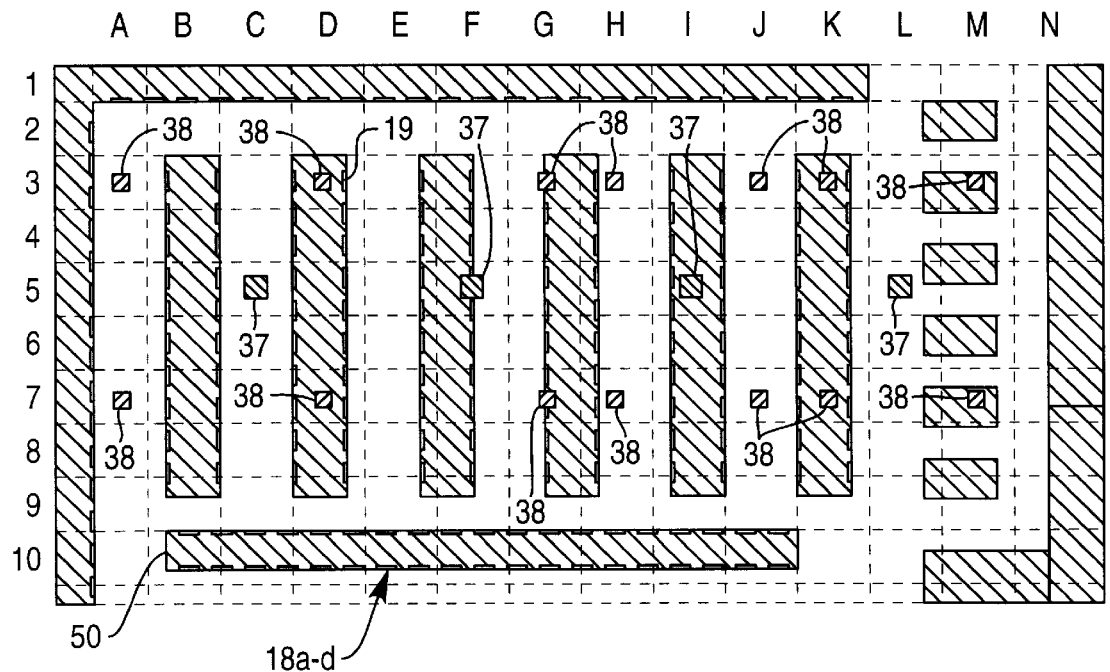
FIG. 3 is a first example of a map of a transaction establishment.

Turning now to FIG. 3, a map of a transaction establishment illustrates the location of shelves 50 and EPLs 18a–d.

The locations of EPLs 18a–d are referenced to a two-dimensional coordinate system in which rows are identified by numerals and columns are identified by letters.

In this example, the sought after EPL, EPL 19, is located at position 3D. Receive antennas 38 are located at 3A, 7A, 3D, 7D, 3G, 7G, 3H, 7H, 3J, 7J, 3K, 7K, 3M, and 7M. Transmit antennas 37 are located at 5C, 5F, 5I, and 5L.

If from the information in EPL configuration file 27 it is known that position 3D is 'in back of the pop aisle', then it is also known that an approximate location for EPL 19 is 'in back of the pop aisle'.

In this example, only one receive antenna 38 at position 3D hears the acknowledgment of EPL 19. The primary fix for EPL 19 is position 3D. A less accurate approximation for the fix for EPL 19 is any one of positions 2C, 2D, 2E, 3C, 3E, 4C, 4D, or 4E that surround the primary fix.

Figure 4:
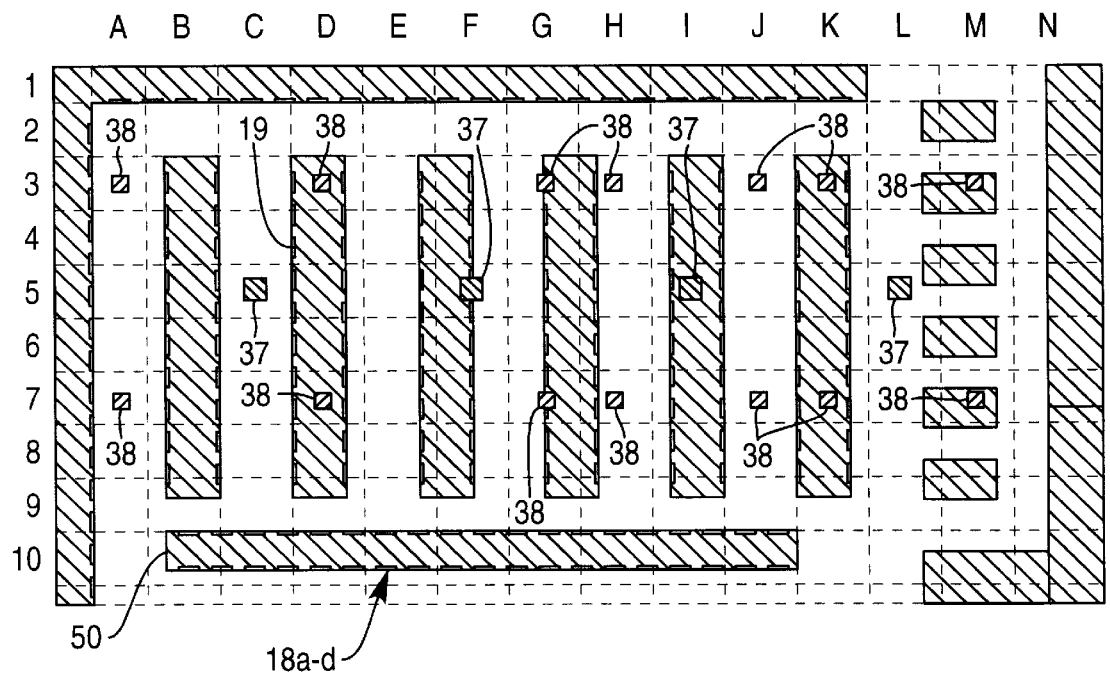
FIG. 4 is a second example of a map of a transaction establishment.

Turning now to FIG. 4, three receive antennae 38 at positions 3D, 3A, and 7D hear the acknowledgment of EPL 19. Antenna 3D reports a relative signal strength of "60", and antennae 3A and 7A report relative signal strengths of "30". The primary approximation for the fix for EPL 19 is position 4C. A secondary approximation for the fix for EPL 19 is any one of positions 3B, 3C, 3D, 4B, 4D, 5B, 5C, or 5D that surround the primary fix. Here, one of the secondary approximate fixes, 4D, is more accurate.

Figure 5:
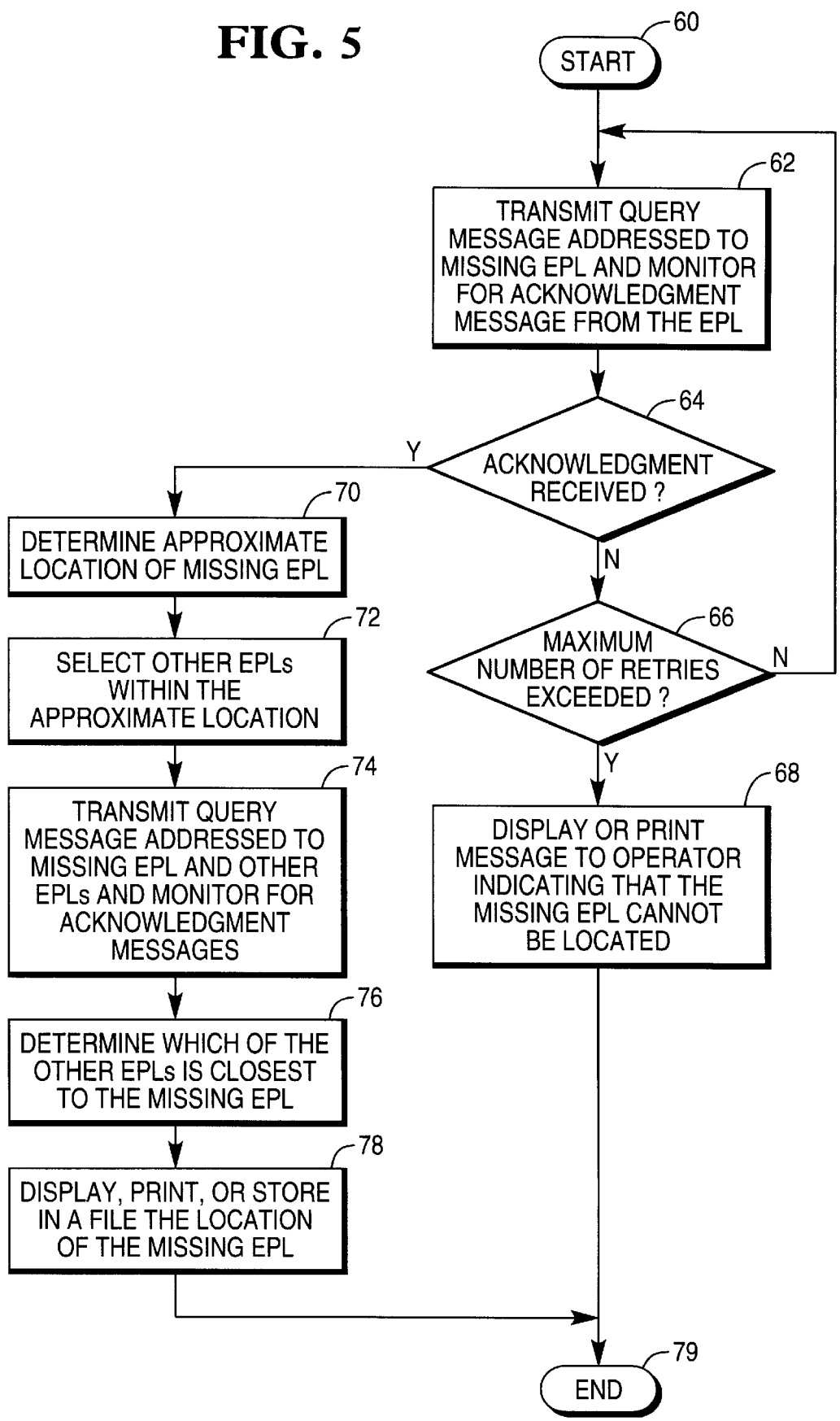
FIG. 5 is a flow diagram illustrating the method of locating a missing EPL.

Turning now to FIG. 5, the method of the present invention and the operation of EPL locator software 30 are explained in more detail, beginning with START 60.

In step 62, EPL locator software 30 works with EPL control software 20 to cause CBSs 15a–d to transmit a query message to a particular missing EPL, such as EPL 19.

In step 64, EPL locator software 30 listens for an acknowledgment message from the missing EPL. If an acknowledgment message is not received, the method proceeds to step 66.

In step 66, EPL locator software 30 determines whether the maximum number of transmission retries has been exceeded. Preferably, sixteen is the maximum retry level, but other retry levels may be chosen as the maximum by an operator. If it has not been exceeded, the method returns to step 62 to transmit the query again. If it has been exceeded, the method proceeds to step 68.

In step 68, EPL locator software 30 displays, prints, and/or stores a message indicating that the missing EPL cannot be located. The EPL is either not in the store or not functioning. The method ends in step 79.

Returning to step 64, if an acknowledgment is received, EPL locator software 30 determines an approximate location of the missing EPL in step 70.

In step 72, EPL locator software 30 selects other EPLs within the determined approximate location by reading EPL system configuration file 27.

In step 74, EPL locator software 30 works with EPL control software 20 to cause CBSs 15a–d to transmit a query message to the missing EPL and to the other EPLs.

In step 76, EPL locator software 30 determines which of the other EPLs is closest to the missing EPL by examining signal strength and noise information received from all receive antennae that obtain a response. Alternatively, EPL locator software 30 reads previous location information in EPL configuration file 27 and directs the operator to where the missing EPL should be placed once it is found.

In step 78, EPL locator software 30 displays, prints, and/or stores the location of the missing EPL. An operator may then visit the determined location, retrieve the missing EPL, and reinstall the missing EPL.

In step 79, the method ends.

Turning now to FIG. 6, step 70 of FIG. 5 is explained in more detail, beginning with START 80. Additionally, if for some reason in step 76 previous location information is not available in EPL configuration file 27, then 76 would use the process in FIG. 5 as well.

In step 82, the locations of antennas 38 are determined. As an optional step, the locations of CBSs 15a–d may be plotted on the map of FIG. 3, but are included in configuration file 27 at installation time.

In step 84, the locations of EPLs 18a–d are determined. As an optional step, the locations of EPLs 18a–d may be plotted on the map of FIG. 3. This information is available in EPL configuration file 27, but step 84 must be performed regularly since changes occur often.

In step 85, EPL control software causes CBSs 15a–d to transmit a query message to a particular missing EPL, such as EPL 19.

In step 86, EPL locator software 30 listens for an acknowledgment message from the missing EPL.

In step 88, EPL locator software 30 determines the signal strengths of any acknowledgment message from the missing EPL to one of antennas 38 within CBSs 15a–d.

In step 89, EPL locator software 30 determines whether signal strength information for the last of antennas 38 has been determined. If all CBSs 15a–d have been polled for signal strength information about their antennas 38, the method continues to step 90. If a CBS has not been polled, the method returns to step 88.

In step 90, EPL locator software 30 determines the primary and secondary estimates of fixes to the antennas 38 on the map in FIG. 3. If multiple antennas 38 receive the acknowledgment message, EPL locator software 30 uses basic radar tracking methods to determine the approximate location of the missing EPL.

In step 92, EPL locator software 30 optionally converts the fixes to types of goods using information in EPL configuration file 27.

In step 94, EPL locator software 30 displays, prints, and/or stores in missing EPL action file 29 the primary and secondary estimates of the location coordinates and/or types of goods where the desired EPL is most likely located. A sample report is shown in FIG. 7.

In step 96, the method ends.

Although the present invention has been described with particular reference to certain preferred embodiments thereof, variations and modifications of the present invention can be effected within the spirit and scope of the following claims.

What is claimed is:

1. A method of locating a wireless electronic price label in a transaction establishment comprising the steps of:
    (a) receiving a message from the wireless electronic price label;
    (b) determining a first approximate location of the electronic price label from characteristics of the message received from the electronic price label;
    (c) selecting other wireless electronic price labels in proximity with the first approximate location;
    (d) receiving messages from a number of the other wireless electronic price labels whose locations are known;
    (e) determining which of the number of the other wireless electronic price labels is closest to the electronic price label from characteristics of the messages from the number of the other wireless electronic price labels; and
    (f) determining a second approximate location of the wireless electronic price label based on the location of the closest wireless electronic price label.

2. A method of locating a wireless electronic price label in a transaction establishment comprising the steps of:
    (a) transmitting a message to the wireless electronic price label;
    (b) monitoring for a return message from the wireless electronic price label;
    (c) performing steps (a) and (b) a number of times;
    (d) receiving the return message from the wireless electronic price label by a number of receive antennae;
    (e) determining a first approximate location of the wireless electronic price label from signal-to-noise information associated with the return message at each receive antennae;
    (f) selecting other wireless electronic price labels, whose locations are known, within a predetermined distance of the approximate location;
    (g) transmitting another message to the other wireless electronic price labels;
    (h) monitoring for return messages from the other wireless electronic price labels;
    (i) performing steps (g) and (h) a number of times;
    (j) receiving the return messages from a number of the other wireless electronic shelf labels by a number of receive antennae;
    (k) determining which of the number of the other wireless electronic price labels is closest to the wireless electronic price label from signal-to-noise information associated with the return messages from the number of the other wireless electronic price labels at each of the number of receive antennae;
    (l) determining a second approximate location of the wireless electronic price label based on the location of the closest wireless electronic price label; and
    (m) indicating to an operator the second approximate location of the wireless electronic electronic price label.

3. A method of locating a wireless electronic price label in a transaction establishment comprising the steps of:
    (a) transmitting a message to the wireless electronic price label;
    (b) monitoring for a return message from the wireless electronic price label;
    (c) performing steps (a) and (b) a number of times;
    (d) receiving the return message from the wireless electronic price label;
    (e) determining a first approximate location of the wireless electronic price label from characteristics of the return message;
    (f) selecting other wireless electronic price labels, whose locations are known, within a predetermined distance of the approximate location;
    (g) transmitting another message to the other wireless electronic price labels;
    (h) monitoring for return messages from the other wireless electronic price labels;
    (i) performing steps (g) and (h) a number of times;
    (j) receiving the return messages from a number of other wireless electronic price labels;
    (k) determining which of the number of the other wireless electronic price labels is closest to the wireless electronic price label from characteristics of the return messages from the number of the other wireless electronic price labels;
    (l) determining a second approximate location of the wireless electronic price label based on the location of the closest of the number of the other wireless electronic price labels; and
    (m) indicating to an operator the second approximate location of the wireless electronic price label.

4. The method of claim 1 further comprising the step of storing an electronic price label configuration file including addresses of electronic price labels and location data for the location within the transaction establishment for the electronic price labels.

5. The method of claim 4 wherein said location data further establishes the location of the electronic price labels relative to the location of different types of goods.

6. The method of claim 4 wherein said step of selecting further comprises utilizing said stored location data to determine the other wireless electronic price labels in proximity with the first approximate location determined from characteristics of the message received from the electronic price label.

7. The method of claim 1 wherein said step of determining a first approximate location further comprises utilizing electronic price label software to monitor received signal strength from the electronic price label and to determine the first approximate location of the electronic price label.

8. The method of claim 1 further comprising the step of displaying the second approximate location of the wireless electronic price label.

9. The method of claim 1 further comprising the steps of locating an additional plurality of wireless electronic price labels and printing a list of electronic price labels which are not in their assigned positions.

10. The method of claim 1 further comprising the step of storing an entry in a missing electronic price label action file if it is determined that the second approximate location differs from an assigned position.

11. The method of claim 1 further comprising the step of storing a map of the transaction establishment including the location of store shelves and wireless electronic price labels in memory.

12. The method of claim 11 further comprising the step of referencing the locations of store shelves and wireless electronic price labels to a two-dimensional coordinate system.

13. The method of claim 1 further comprising the steps of:

identifying the wireless electronic price label as missing; and transmitting a query message to the wireless electronic price label before said step of receiving a message.

14. The method of claim 13 further comprising the step of retransmitting the query message if no message is received in response up to a predetermined number of retries.

15. The method of claim 14 further comprising the step of storing in memory a message that the wireless electronic price label was not located if the predetermined number of retries has occurred without receiving a message in response.

16. The method of claim 1 wherein the step of selecting other wireless electronic price labels in proximity further comprises reading and analyzing electronic price label system configuration file data.

17. The method of claim 16 wherein the step of determining which of the number of other wireless electronic price labels is closest further comprises transmitting a query to the wireless electronic price labels; and determining which of said other wireless electronic price labels is closest by examining signal strength and noise information from one or more receive antennae that receive a response.

18. The method of claim 1 further comprising the step of directing an operator to where the wireless electronic price label is located.

19. The method of claim 18 further comprising the step of directing the operator to where the wireless electronic price label should be placed once it is found.

20. The method of claim 18 wherein said step of directing further comprises providing the operator with an indication of the type of goods in the second approximate location of the wireless electronic price label.

* * * * *